United States Patent
Umekage et al.

(10) Patent No.: US 7,360,449 B2
(45) Date of Patent: *Apr. 22, 2008

(54) ULTRASONIC FLUID MEASUREMENT INSTRUMENT HAVING A PLURALITY OF SPLIT CHANNELS FORMED BY PARTITION BOARDS

(75) Inventors: Yasuhiro Umekage, Shiga (JP); Yoshinori Inui, Nara (JP); Yukio Nagaoka, Kyoto (JP); Hajime Miyata, Nara (JP); Shigeru Iwanaga, Nara (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/785,728

(22) Filed: Apr. 19, 2007

(65) Prior Publication Data

US 2007/0193367 A1    Aug. 23, 2007

Related U.S. Application Data

(62) Division of application No. 10/544,669, filed as application No. PCT/JP2004/002119 on Feb. 24, 2004, now Pat. No. 7,237,441.

(30) Foreign Application Priority Data

Feb. 24, 2003 (JP) ............................. 2003-045616
Mar. 17, 2003 (JP) ............................. 2003-071395

(51) Int. Cl.
*G01F 1/84* (2006.01)

(52) U.S. Cl. .................................................. 73/861.27

(58) Field of Classification Search ............. 73/861.27, 73/861.28, 861.29
See application file for complete search history.

(56) References Cited

U.S. PATENT DOCUMENTS

| | | |
|---|---|---|
| 4,156,158 A | 5/1979 | Wilson et al. |
| 4,365,518 A | 12/1982 | Zacharias, Jr. |
| 5,650,572 A | 7/1997 | Vontz |
| 5,777,237 A | 7/1998 | Collier et al. |
| 5,811,689 A | 9/1998 | Collier et al. |
| 5,907,099 A | 5/1999 | Huang et al. |

(Continued)

FOREIGN PATENT DOCUMENTS

CN    1116877    2/1996

(Continued)

OTHER PUBLICATIONS

Supplementary European Search Report for EP 04714003 dated Aug. 1, 2007.

*Primary Examiner*—Harshad Patel
(74) *Attorney, Agent, or Firm*—Wenderoth, Lind & Ponack, L.L.P.

(57) ABSTRACT

An ultrasonic fluid measurement instrument is capable of highly accurate fluid measurement. A measurement part is provided forming a plurality of split channels partitioned by partition boards halfway across a fluid channel, and at least a pair of ultrasonic transmitter-receivers for transmitting ultrasonic waves into the fluid flowing through the split channels and receiving ultrasonic waves that have passed through the fluid. Further, an arithmetic unit calculates the flow velocity and/or flow volume of the fluid according to the propagation time of the ultrasonic waves. The measurement part further includes an approach channel for preliminarily rectifying the fluid flowing to the split channels.

22 Claims, 11 Drawing Sheets

U.S. PATENT DOCUMENTS

| | | |
|---|---|---|
| 6,338,277 B1 | 1/2002 | Diston et al. |
| 6,526,838 B1 | 3/2003 | Froelich et al. |
| 6,748,811 B1 | 6/2004 | Iwanaga et al. |
| 7,237,441 B2 * | 7/2007 | Umekage et al. ........ 73/861.27 |

FOREIGN PATENT DOCUMENTS

| | | |
|---|---|---|
| CN | 1136844 | 11/1996 |
| DE | 19727960 A1 | 2/1999 |
| EP | 0392294 A1 | 10/1990 |
| JP | 5-093637 | 4/1993 |
| JP | 9-043015 | 2/1997 |
| JP | 9-145438 | 6/1997 |
| JP | 11-051735 | 2/1999 |
| WO | 94/09342 | 4/1994 |
| WO | 00/55581 | 9/2000 |

* cited by examiner

US 7,360,449 B2

ULTRASONIC FLUID MEASUREMENT INSTRUMENT HAVING A PLURALITY OF SPLIT CHANNELS FORMED BY PARTITION BOARDS

This application is a divisional of U.S. application Ser. No. 10/544,669, filed Aug. 4, 2005, now U.S. Pat. No. 7,237,441 which is a U.S. National Phase application of PCT International Application No. PCT/JP2004/002119, filed Feb. 24, 2004.

BACKGROUND OF THE INVENTION

1. Field of the Invention

The present invention relates to an ultrasonic fluid measurement instrument that measures flow velocity and flow volume of fluid such as gas and water utilizing the propagation time of ultrasonic waves.

2. Description of the Related Art

The conventional ultrasonic fluid measurement instrument that measures flow volume and the like utilizing the propagation time of ultrasonic waves is provided with a measurement part halfway across the fluid channel to measure the flow velocity of fluid flowing through this measurement part according to the propagation time of ultrasonic waves between ultrasonic transmitter-receivers. The flow volume is obtained by multiplying the flow velocity measured above, by the cross-sectional area of the channel in the measurement part, and by a given correction coefficient.

The most significant element that enables highly accurate measurement for flow volume and the like is a flowing state of fluid in the above-mentioned measurement part. In other words, a turbulent fluid flow in the measurement part causes disruption in ultrasonic propagation, disabling highly accurate measurement.

Under the circumstances, the following arrangement has been devised conventionally as disclosed in Japanese Patent Unexamined Publication No. H09-43015. That is, a measurement part is rectangular with its rectangle cross-section, and the short side is partitioned by partition boards to form plural flat split channels in parallel with the long side. The flat split channels effectively make the fluid flow into a laminar flow, namely a two-dimensional stable flow.

Meanwhile, the measurement part composed of the above-mentioned plural flat split channels is significantly large in width compared to the fluid channel for admitting fluid.

Therefore, the measurement part is connected to the fluid channel through a tapered connection part with a larger width at the downstream side.

As a result, this tapered connection part causes a turbulent flow in the fluid, and thus the fluid becomes resistant to flowing evenly through all the split channels, resulting in decreasing measurement accuracy.

The present invention, aiming at solving such conventional problems, provides an ultrasonic fluid measurement instrument that enables highly accurate measurement of fluid flow.

SUMMARY OF THE INVENTION

An ultrasonic fluid measurement instrument according to the present invention is equipped with a fluid channel having a measurement part formed with plural split channels partitioned by partition boards halfway across the channel; at least a pair of ultrasonic transmitter-receivers that transmit ultrasonic waves into fluid flowing through the above-mentioned split channels, and receive ultrasonic waves that have passed through the fluid; and an arithmetic unit for calculating at least one of the flow velocity and flow volume of fluid according to the propagation time of ultrasonic waves generated by the above-mentioned ultrasonic transmitter-receivers. The above-mentioned measurement part is provided with an approach channel for preliminarily rectifying fluid flowing to the split channels.

Another ultrasonic fluid measurement instrument according to the present invention is equipped with a fluid channel; a measurement part composed separately from the fluid channel, formed with plural split channels partitioned by partition boards; at least a pair of ultrasonic transmitter-receivers that transmit ultrasonic waves into fluid flowing through the above-mentioned split channels, and receive ultrasonic waves that have passed through the fluid; and an arithmetic unit for calculating at least one of the flow velocity and flow volume of fluid according to the propagation time of ultrasonic waves generated by the above-mentioned ultrasonic transmitter-receivers. The above-mentioned measurement part is provided with an approach channel for preliminarily rectifying fluid flowing to the split channels.

DETAILED DESCRIPTION OF THE INVENTION

Hereinafter, a description will be made for exemplary embodiments of the present invention, referring to drawings.

Here, the drawings are schematic and do not show respective dimensional positions correctly. The frequency of ultrasonic waves in the present invention ranges from 20 KHz to 1 MHz, where 500 KHz is desirable.

Exemplary Embodiment 1

Figure 1:
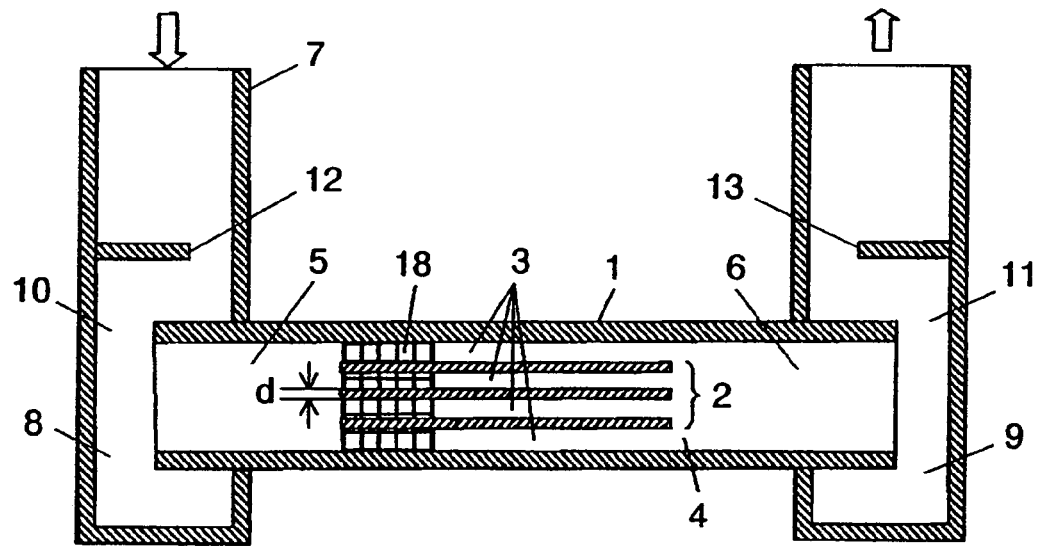
FIG. 1 shows a longitudinal sectional view of an ultrasonic fluid measurement instrument according to exemplary embodiment 1 of the present invention.
Figure 2:
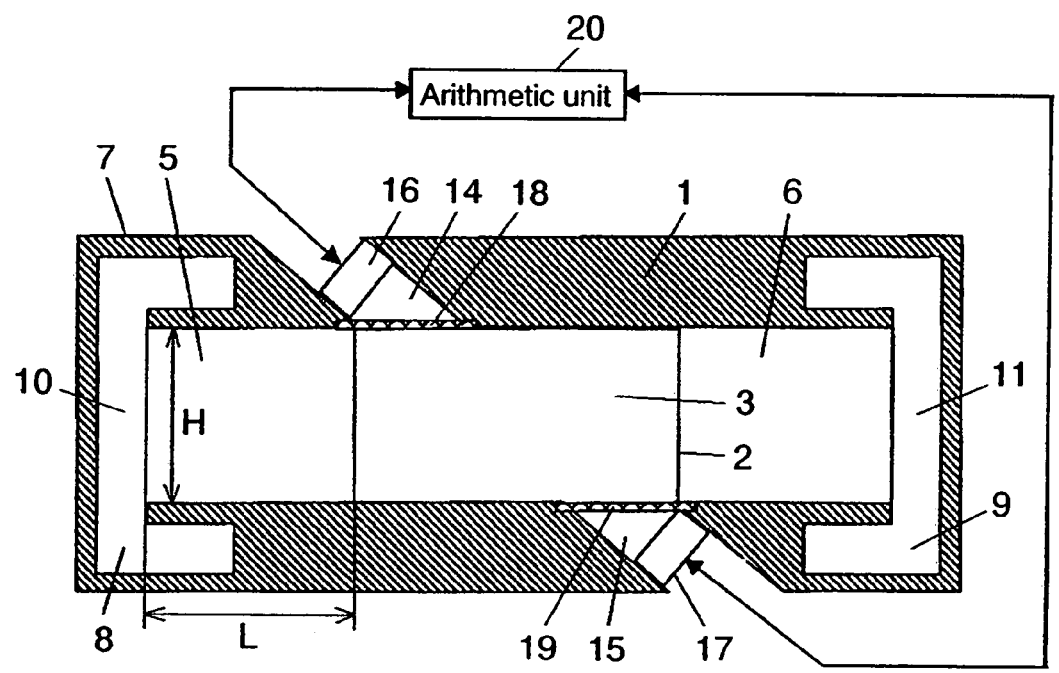
FIG. 2 shows a transverse sectional view of an ultrasonic fluid measurement instrument according to exemplary embodiment 1 of the present invention.

As shown in FIGS. 1 and 2, the intermediate part of rectangular measurement part 1 with its rectangle cross-section is partitioned by a plurality of partition boards 2 at its short side.

In this way, a large number of split channels 3 are formed in parallel with the long side, the collection of which composes multilayer channel 4. This embodiment shows 4-layer structure.

Each split channel 3 is flat with a given aspect ratio so that the fluid flow will become a two-dimensional flow, namely a laminar flow.

In measurement part 1, approach channels 5 and 6 are formed at the upstream and downstream sides of multilayer channel 4, with a given length and additionally with a fixed size of cross-section in the flow direction.

Fluid channel 7, including measurement part 1, has bent parts 8 and 9, and is equipped with upstream chamber 10 and downstream chamber 11, forming a U-shape together with above-mentioned measurement part 1.

The respective distal ends of approach channels 5 and 6 in the above-mentioned measurement part 1 are positioned so as to project through bent parts 8 and 9 of upstream chamber 10 and downstream chamber 11, respectively. Folding-back plates 12 and 13 are respectively arranged at a further upstream part than upstream chamber 10 and at a further downstream part than downstream chamber 11, of fluid channel 7.

Recesses 14 and 15 formed on the short side wall of measurement part 1 are provided with ultrasonic transmitter-receivers 16 and 17 each made of a pair of ultrasonic oscillators arranged so as to face to each split channel 3. The ultrasonic propagation path between ultrasonic transmitter-receivers 16 and 17 is provided so as to obliquely cross the direction of the fluid stream flowing through each split channel 3.

Recesses 14 and 15 provided with the above-mentioned ultrasonic transmitter-receivers 16 and 17 are covered with ultrasonic-transparent members 18 and 19 made of a perforated plate such as wire mesh or punching metal, at the side of split channels 3, so as not to form steps on the channel walls.

Arithmetic unit 20 calculates flow velocity of fluid, or flow volume by multiplying the flow velocity calculated by the cross-sectional of area of each split channel 3, and by a given correction coefficient, according to the propagation time of ultrasonic waves generated by a pair of ultrasonic transmitter-receivers 16 and 17.

Thickness (d) of partition boards 2 is set to be shorter (e.g., 0.3 mm) than the wavelength of ultrasonic waves (e.g., 0.7 mm).

The length (L) of approach channels 5 and 6 in the flow direction of the fluid is set to be longer than the height (H) of the short side.

In the above-mentioned arrangement, the velocity of fluid flowing in from one end of U-shaped fluid channel 7 is decelerated and uniformized in upstream chamber 10, and the fluid flows in through the periphery of projected approach channel 5. This way implements further uniformized flow.

Approach channel 5, long in the flow direction, further smoothes the flow, allowing the fluid to evenly flow into each split channel 3 of multilayer channel 4. More specifically, with approach channel 5 longer than the height in the length direction, a fluid flowing in through the inlet of approach channel 5 at an angle is diverted in the length direction.

Therefore, fluid is to evenly flow into each split channel 3 of multilayer channel 4. As a result ultrasonic waves propagate through even streams in each split channel 3, allowing the propagation time generated by the stream to be measured accurately.

Meanwhile, split channels 3 are very narrow (e.g., between 1 mm and 4 mm, optimally approximately 2 mm), and thus ultrasonic waves pass through the entire channels from the bottom to the top, enabling measurement without being influenced by the distribution of flow velocity.

Consequently, the correction coefficient (referred to as "flow volume coefficient" as well) for converting propagation time to flow volume remains constant all through from small flow volumes to large ones.

In addition, without being influenced by the distribution of flow velocity, the correction coefficient remains constant regardless of type of fluid (e.g., air, 13A-type city gas, liquefied petroleum gas).

Split channels 3 are so narrow that ultrasonic waves propagate through the uneven stream distribution in the channel even if pulsatile flow occurs. Consequently, the propagation time agrees with the time during which ultrasonic waves are influenced by the uneven pulsatile flow, enabling the pulsatile flow to be accurately measured.

Further, the downstream side of multilayer channel 4 has a symmetric shape with the upstream side, and thus reverse flow can be measured accurately as well, even if reverse flow occurs due to pulsatile flow. Therefore, measurement of flow volume can be performed in a highly accurate manner for both forward and reverse pulsatile flows.

In a gas meter, for example, the flow volume of gas can be measured accurately because measurement can be performed for both forward and reverse pulsatile flows.

Here, if reverse flow cannot occur, approach channel 6 at the downstream side may be omitted.

Partition boards 2, with thickness (d) shorter than the wavelength of ultrasonic waves are resistant to inhibiting propagation of ultrasonic waves, allowing transmitting and receiving with a high signal level. Consequently, ultrasonic waves are transmitted and received accurately with a high signal-to-noise ratio, resulting in a highly accurate measurement of flow volume.

The side of multilayer channel 4, equipped with ultrasonic transmitter-receivers 16 and 17, is formed with recesses 14 and 15 where the ultrasonic transmitter-receivers 16 and 17 are mounted. The side is provided with ultrasonic-transparent members 18 and 19 to cover it, without steps in parallel with the wall surface of the channel. Therefore, the ultrasonic-transparent members 18 and 19 prevent the stream from flowing into recesses 14 and 15 and generating a turbulent flow. In this way, flow volume can be measured with a high accuracy in a wide range of flow volume, and a whirlpool is suppressed against pulsatile flow, allowing flow volume to be measured accurately.

If wire mesh is adopted as the ultrasonic-transparent members 18 and 19, the mesh size is to be set in the range from 50 to 500 meshes (optimally 120 to 200 meshes). In this way, sound waves can be efficiently transmitted at ultrasonic frequencies with their wavelength of approximately 0.7 mm to transmit and to receive ultrasonic waves with a high sensitivity, increasing accuracy in measuring flow volume.

Odd number (for example, three) of partition boards 2 partitioning split channels 3 are arranged at even intervals, where one of them centrally located is to be positioned in the center of the ultrasonic transmitting and receiving regions of ultrasonic transmitter-receivers 16 and 17.

The sensitivity distribution of transmitter-receivers 16 and 17 generally represents highest in sensitivity at its center, and thus dividing the sensitivity distribution so that one of partition boards 2 will be positioned at the highest part allows ultrasonic waves to propagate through each split channel 3 evenly.

Because the transmitting and receiving is accomplished by the ultrasonic waves being evenly distributed, measurement can be performed accurately at each split channel 3, allowing the measurement of flow volume to be highly accurate.

Here, when an even number of partition boards 2 is arranged, one of them can be positioned in the center of the ultrasonic transmitting and receiving regions of ultrasonic transmitter-receivers 16 and 17, by adjusting mutual intervals. In this case, split channels 3 obviously need to satisfy the requirement that fluid flow two-dimensionally.

Here, partition boards 2 partitioning split channels 3 are desirably surface-treated with a nonviscous material. As a nonviscous material, fluorine oil, silicone oil, or the like is used. Alternatively, fluorocarbon resin may used for partition boards 2, or may be laminated on partition boards 2. In this way, foreign matter is prevented from attaching to a narrow gap, improving durability and reliability. Further, the above-mentioned surface treatment may be applied not only to partition boards 2, but to the entire split channels 3, where obviously fluorocarbon resin may be used in the same way.

Exemplary Embodiment 2

Figure 3:
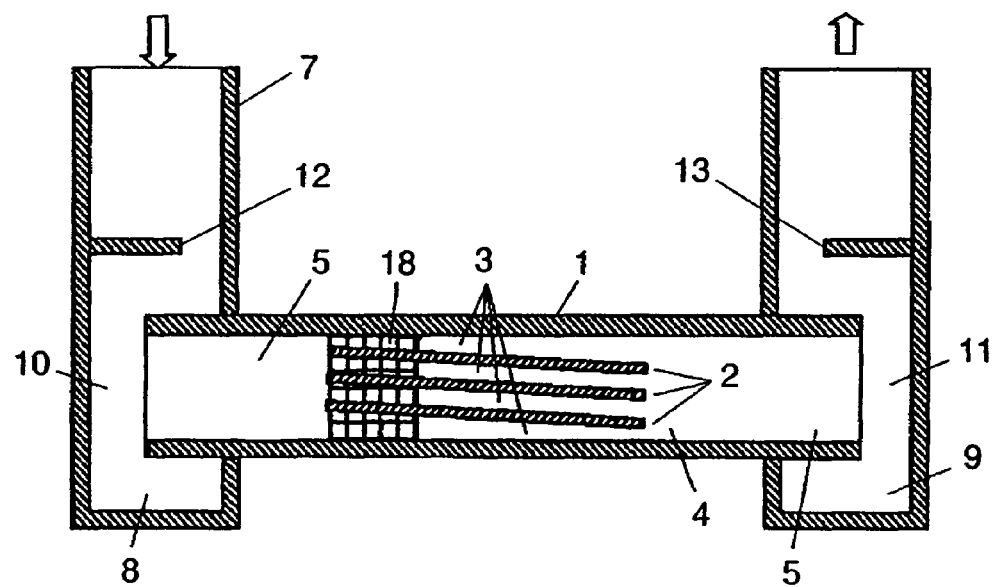
FIG. 3 shows a longitudinal sectional view of an ultrasonic fluid measurement instrument according to exemplary embodiment 2 of the present invention.

FIG. 3 shows partition boards 2 inclined so that the lower part will be positioned at the downstream side.

As a result from the partition boards 2 being inclined in this way, foreign matter on them flows downstream due to the inclination and a stream through approach channel 6 to downstream chamber 11, and thus foreign matter is resistant to accumulating in multilayer channel 4.

Here, the description is made for the arrangement in which the boards are inclined downstream. However, the same effect in which foreign matter falls into upstream chamber 10, is expected when pulsatile flow occurs, even if inclined upstream.

Additionally, the projected distal end of approach channel 5 prevents foreign matter that has fallen into the above-mentioned upstream chamber 10 from flowing back to split channels 3, implementing the channel with a small amount of foreign matter clogged.

Exemplary Embodiment 3

Figure 4:
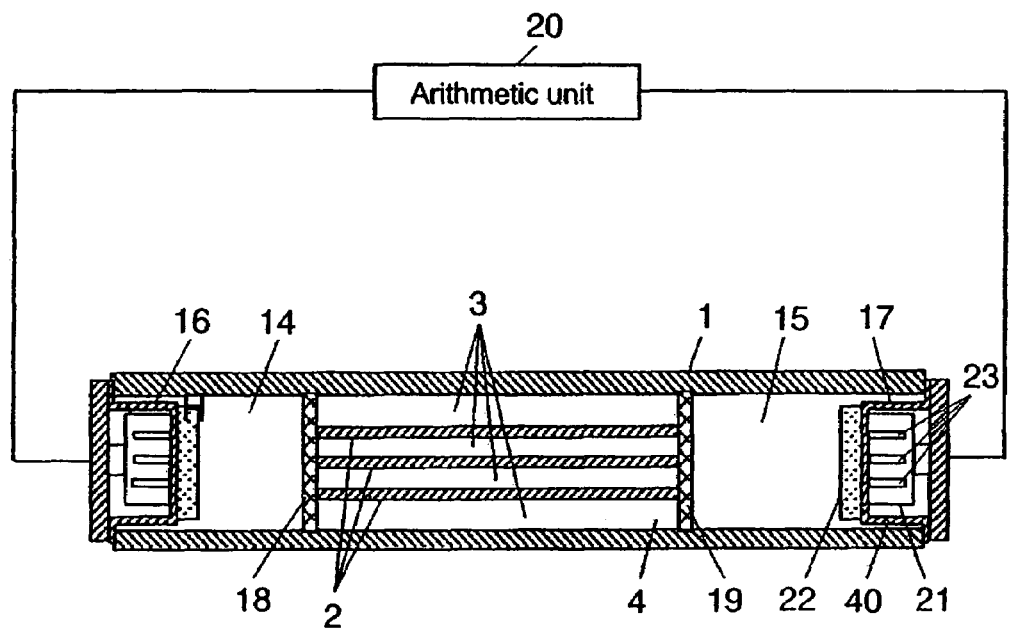
FIG. 4 shows a longitudinal sectional front view of an ultrasonic fluid measurement instrument according to exemplary embodiment 3 of the present invention.

FIG. 4 shows exemplary embodiment 3 in which propagation of ultrasonic waves through each split channel 3 is further improved. More specifically, ultrasonic transmitter-receivers 16 and 17 are provided with piezoelectric oscillators 21 and acoustic matching layers 22, fixed on the inner and outer top surfaces of case 40, respectively, by means of bonding or the like.

Further, the above-mentioned piezoelectric oscillator 21 is divided by plural slits 23 that are arranged in the same direction as and additionally in parallel with the above-mentioned partition boards 2. Here, ultrasonic transmitter-receivers 16 and 17 have the same arrangement, and thus the description is made for only ultrasonic transmitter-receiver 17 in this example.

The same number of slits 23 are provided as that of partition boards 2 partitioning split channels 3 so as to correspond to each other.

Accordingly, it is obvious that ultrasonic waves can be efficiently transmitted through each split channel 3. Moreover, the part with a high sensitivity can face to split channels 3, and that with a low sensitivity to partition boards 2.

The interval between slits 23 with roughly the same length as the thickness of partition boards 2 allows ultrasonic waves to propagate through split channels 3 between partition boards 2 more smoothly.

Therefore, ultrasonic waves pass through each thin layer evenly, allowing flow velocity at each layer to be measured accurately. Consequently, the correction coefficient for converting propagation time to flow volume (also referred to as "flow volume coefficient") remains constant (e.g., 1) all through from small flow volumes to large ones, namely a flat characteristic.

As a result that ultrasonic waves propagate through the entire cross-sectional area of each split channel 3, flow velocity can be measured accurately, even for reverse flow due to pulsatile flow in the same way. Highly accurate measurement can be thus performed for flow volume of both forward and reverse flows.

In a gas meter, for example, the flow volume of gas can be measured accurately because measurement can be performed for both forward and reverse and pulsatile flows.

Exemplary Embodiment 4

Figure 5:
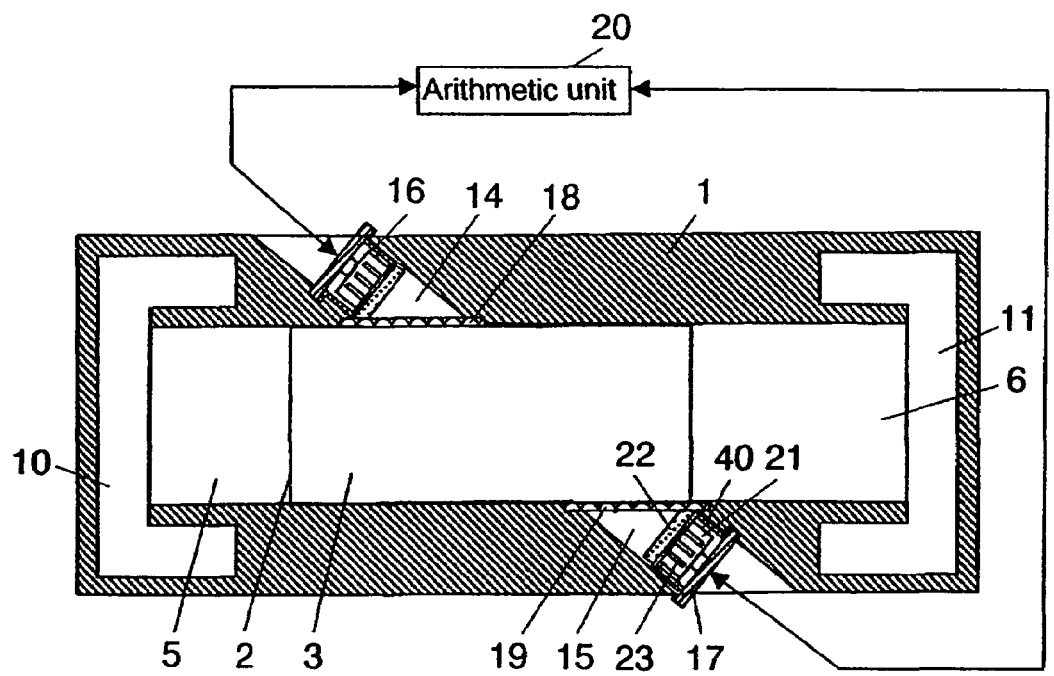
FIG. 5 shows a longitudinal sectional front view of an ultrasonic fluid measurement instrument according to exemplary embodiment 4 of the present invention.

Next, FIG. 5 shows an example in which slits 23 formed in piezoelectric oscillator 21 of ultrasonic transmitter-receivers 16 and 17 are positioned orthogonally to partition boards 2. The other parts of the arrangement of piezoelectric oscillator 21 are the same as in FIG. 4, and the arrangement of ultrasonic transmitter-receivers 16 and 17 is the same. Therefore, this example will describe only ultrasonic transmitter-receiver 17.

As a result that slits 23 of piezoelectric oscillator 21 are provided in a direction orthogonal to partition boards 2 as mentioned above, ultrasonic waves can propagate through other split channels 3 even if one of the split channels 3 is defective, implementing highly reliable measurement.

Further, the propagation of ultrasonic waves through flat split channels 3 enables the flow volume coefficient to approximate 1, and thus a flat characteristic is available from small flow volumes to large flow volumes.

Exemplary Embodiment 5

Figure 6:
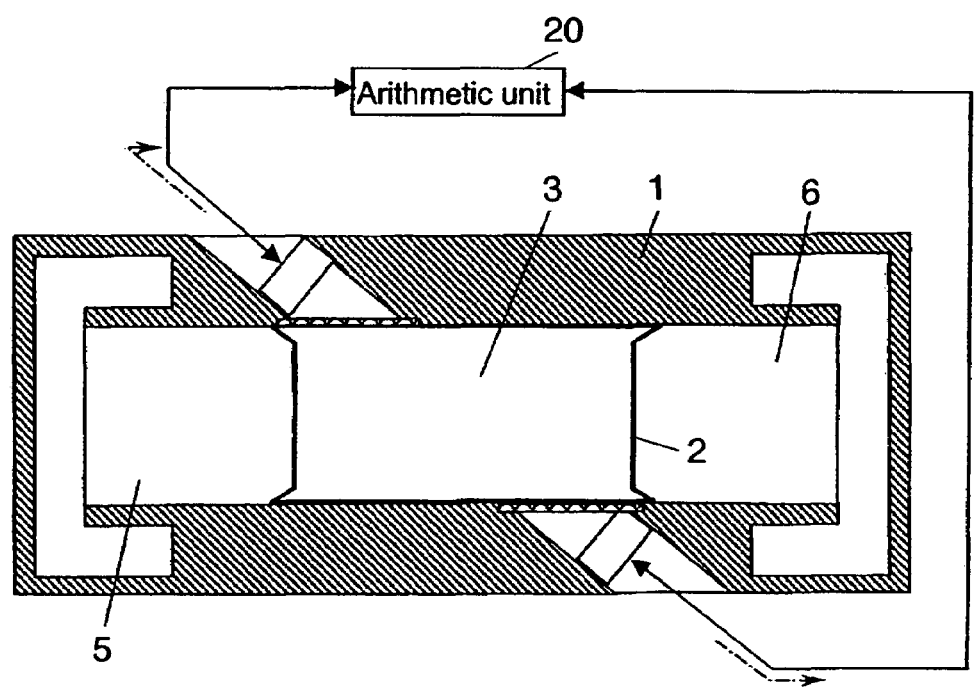
FIG. 6 shows a transverse sectional view of an ultrasonic fluid measurement instrument according to exemplary embodiment 5 of the present invention.

FIG. 6 shows an example in which both upstream end sides of partition boards 2 are projected upstream. This arrangement suppresses influx to the vicinity of the channels at both sides of split channels 3, increases the flow velocity in the central part, and reduces the influence by uneven streams near the boundary layers, further increasing measurement accuracy.

Meanwhile, both downstream end sides of partition boards 3 are projected downstream. This arrangement suppresses influx to the vicinity of the channels at both sides of split channels 3 even with pulsatile flow, increases the flow velocity in the central part, and reduces the influence by uneven streams near the boundary layers, further increasing measurement accuracy.

Exemplary Embodiment 6

Figure 7:
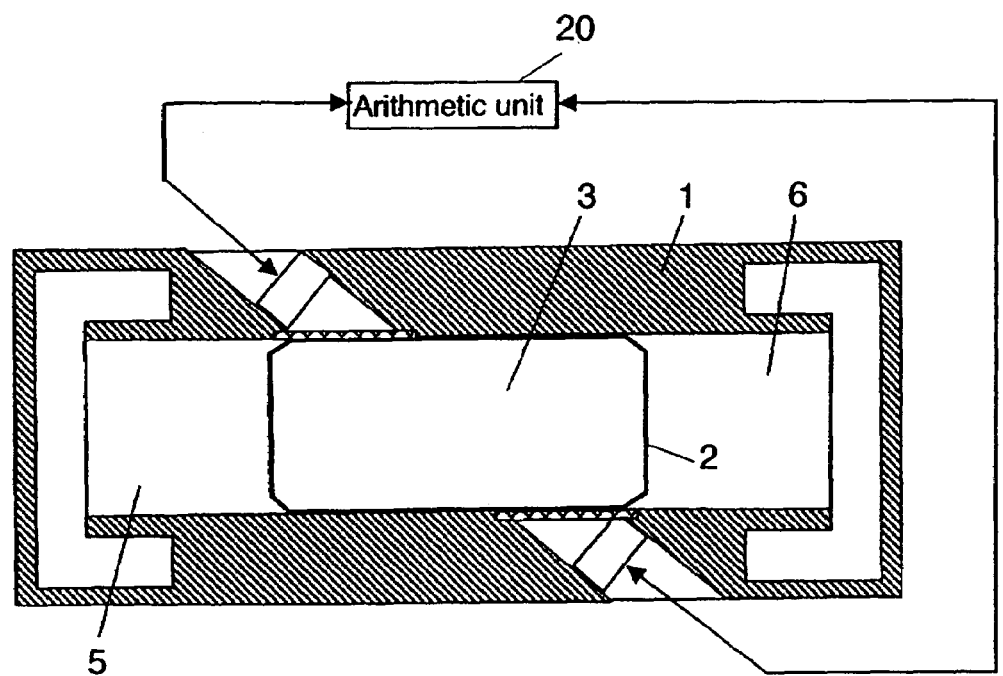
FIG. 7 shows a transverse sectional view of an ultrasonic fluid measurement instrument according to exemplary embodiment 6 of the present invention.

FIG. 7 shows an example in which, in a direction opposite to that in above-mentioned FIG. 6, both upstream end sides of partition boards 2 are retreated downstream. This arrangement reduces foreign matter clogged near the center of split channels 3, increasing durability. In the same way, both downstream end sides of partition boards 3 are retreated upstream to reduce foreign matter clogged near the center of split channels 3, even with pulsatile flow, to increase durability.

Exemplary Embodiment 7

Figure 8:
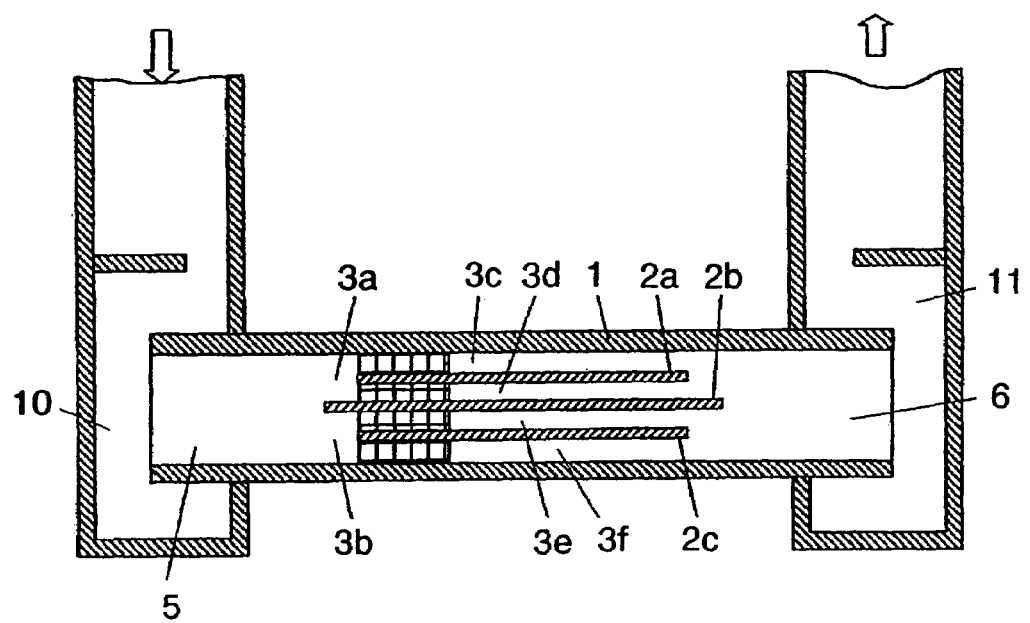
FIG. 8 shows a longitudinal sectional view of an ultrasonic fluid measurement instrument according to exemplary embodiment 7 of the present invention.

The arrangement shown in FIG. 8 is equipped with three partition boards 2a through 2c in which central partition board 2b extends forward beyond other partition boards 2a and 2c. First, this arrangement partitions the channel in measurement part 1 into two split channels 3a and 3b. Next, short partition boards 2a and 2c further partition two split channels 3a and 3b into four split channels 3c, 3d, 3e, and 3f.

In such an arrangement, the fluid with its stream uniformized through approach channel 5 is split into split channels 3a and 3b first, and then into split channels 3c, 3d, 3e, and 3f again. Each stream flows in a laminar flow state through approach channel 6 into downstream chamber 11.

Here, it is assumed that partition boards 2a, 2b, and 2c have the same length and fluid is immediately split into four split channels 3c, 3d, 3e, and 3f. In this case, in the distribution of the flow velocity of fluid flowing through measurement part 1, the flow velocity tends to be high in split channels 3d and 3e, near the inner part; and low in split channels 3c and 3f, near the external wall, thus strongly influenced by the distribution of the flow velocity in approach channel 5.

Figure 9:
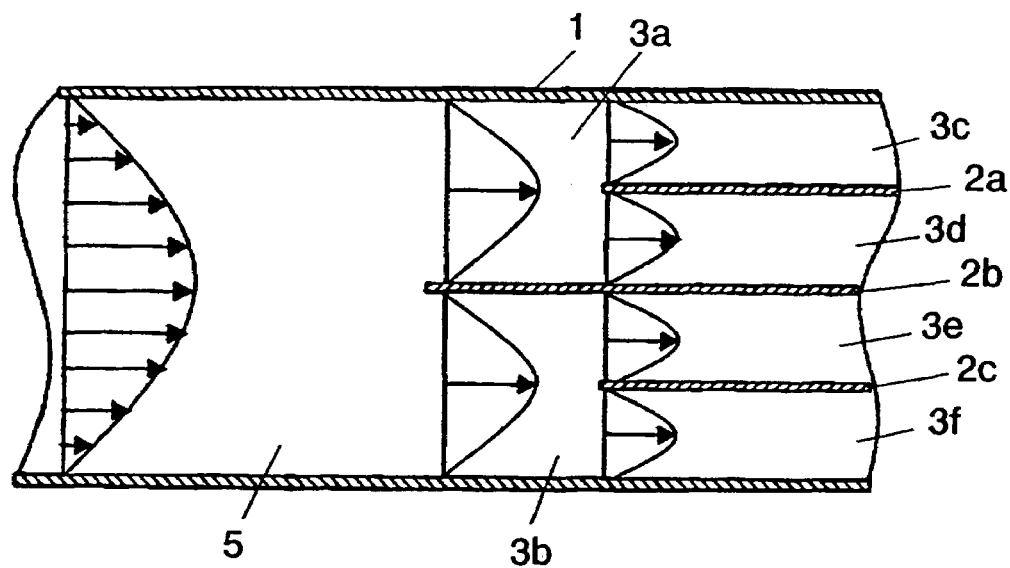
FIG. 9 shows a transverse sectional view for illustrating the actions of an ultrasonic fluid measurement instrument according to exemplary embodiment 7 of the present invention.

Here, as in FIGS. 8 and 9, long partition board 2b provided centrally and short partition boards 2a and 2c provided near the external wall cause the following. That is, substantively increasing channels, such as splitting into two split channels 3a and 3b first, and then into four split channels 3c, 3d, 3e, and 3f, from upstream to downstream in a region for measurement by an ultrasonic transmitter-receiver, causes the flow velocity distribution of fluid to be uniformized.

According to this embodiment as mentioned above, a stream is split, and thus each flow velocity is uniformized through four split channels 3c, 3d, 3e, and 3f each divided, to reduce influence by the flow velocity distribution of fluid in approach channel 5, implementing a highly accurate ultrasonic flowmeter.

Further, the uniformization of flow velocity distribution using partition boards 2a, 2b, and 2c enables accurate measurement over a wide cross-sectional area of a stream independently of a fluid type.

In this embodiment, the description is made for a region measured by the ultrasonic transmitter-receiver of measurement part 1. However, the number of split channels may be changed by changing the length of partition boards 2a, 2b, and 2c for the downstream side as well. In this case, even for reverse flow such as pulsatile flow, the flow velocity of the pulsatile flow is desirably uniformized at the downstream side, allowing accurate measurement.

Here, this embodiment uses three partition boards 2a, 2b, and 2c to finally divide into four split channels 3c, 3d, 3e, and 3f. However, increasing or decreasing the number of split channels by changing the number of partition boards brings the same effect.

When increasing or decreasing the number of split channels, it is desirable to increase partition boards so that they will be arranged symmetrically with respect to the partition board provided at the center of the channel to obtain a uniform flow velocity with the stream distributed.

More preferably, the number of split channels is increased stepwise from upstream to downstream of the channel and each cross-sectional area of the split channels is equalized at each step to distribute the stream evenly.

Exemplary Embodiment 8

Figure 10:
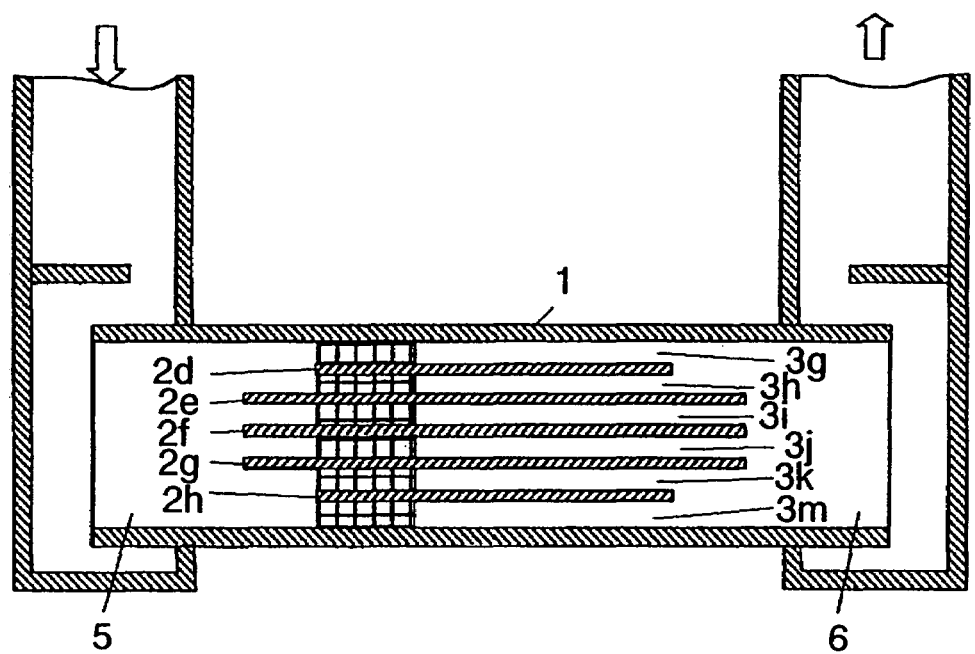
FIG. 10 shows a longitudinal sectional view of an ultrasonic fluid measurement instrument according to exemplary embodiment 8 of the present invention.

In this embodiment, as shown in FIG. 10, the channel in measurement part 1 is divided into six split channels 3g, 3h, 3i, 3j, 3k, and 3m by five partition boards 2d, 2e, 2f, 2g, and 2h.

Then, as a result that three partition boards 2e, 2f, and 2g centrally positioned are extended beyond other partition boards 2d and 2h externally positioned, two split channels 3i and 3j centrally located are set to be longer than other split channels 3g, 3h, 3k, and 3m externally located.

With this arrangement, split channels 3*i* and 3*j* centrally located become longer than other split channels 3*g*, 3*h*, 3*k*, and 3*m*, and thus the resistance when fluid flows through split channels 3*i* and 3*j* becomes higher than that through other split channels 3*g*, 3*h*, 3*k*, and 3*m*.

Consequently, the flow velocity is uniformized both in split channels 3*i* and 3*j* with a high flow velocity and in split channels 3*g*, 3*h*, 3*k*, and 3*m* with a low one.

Here, the number of split channels is not limited at all as long as it corresponds to the flow velocity distribution, and it may be general that the length of the split channels be changed stepwise.

Exemplary Embodiment 9

Figure 11:
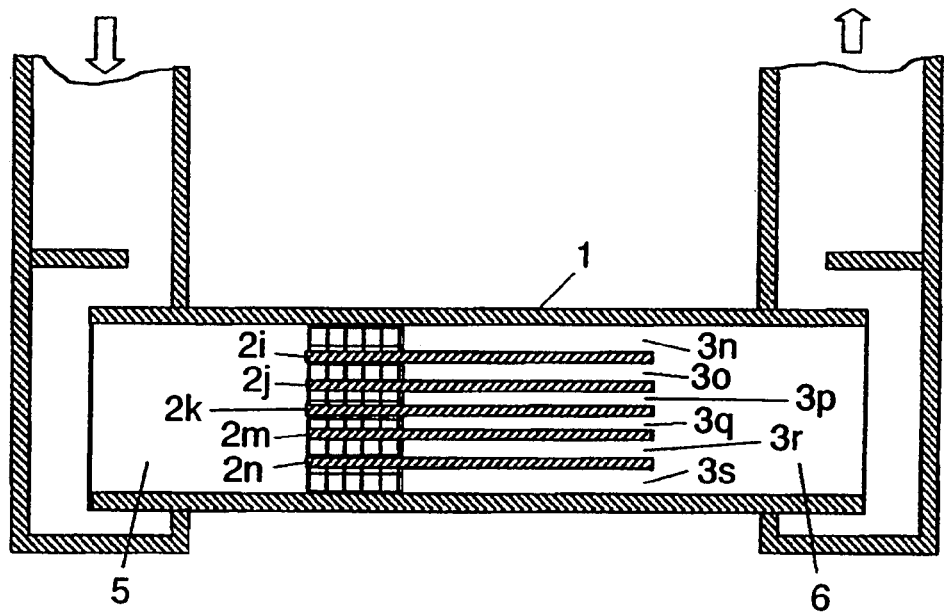
FIG. 11 shows a longitudinal sectional view of an ultrasonic fluid measurement instrument according to exemplary embodiment 9 of the present invention.

In this embodiment, as shown in FIG. 11, the channel of measurement part 1 is divided into six split channels 3*n*, 3*o*, 3*p*, 3*q*, 3*r*, and 3*s* by five partition boards 2*i*, 2*j*, 2*k*, 2*m*, and 2*n*, all with the same length, where the cross-sectional area of split channels is expanded stepwise from the center to external part.

Changing the cross-sectional area of split channels 3*n* through 3*s* is implemented by adjusting adjacent intervals of partition boards 2*i* through 2*n*.

According to this embodiment as mentioned above, the cross-sectional area of split channels 3*n* through 3*s* is incremented from the center part to external. Consequently, even if the flow velocity near the center in approach channel 5 is high, the flow velocity is uniform in each split channel 3*n* through 3*s*, because the cross-sectional area (i.e., corresponding to fluid resistance) of split channels 3*n* through 3*s* is set according to the velocity.

The uniformization of the flow velocity in each split channel 3*n* through 3*s* allows implementing highly accurate measurement of flow volume.

Figure 12:
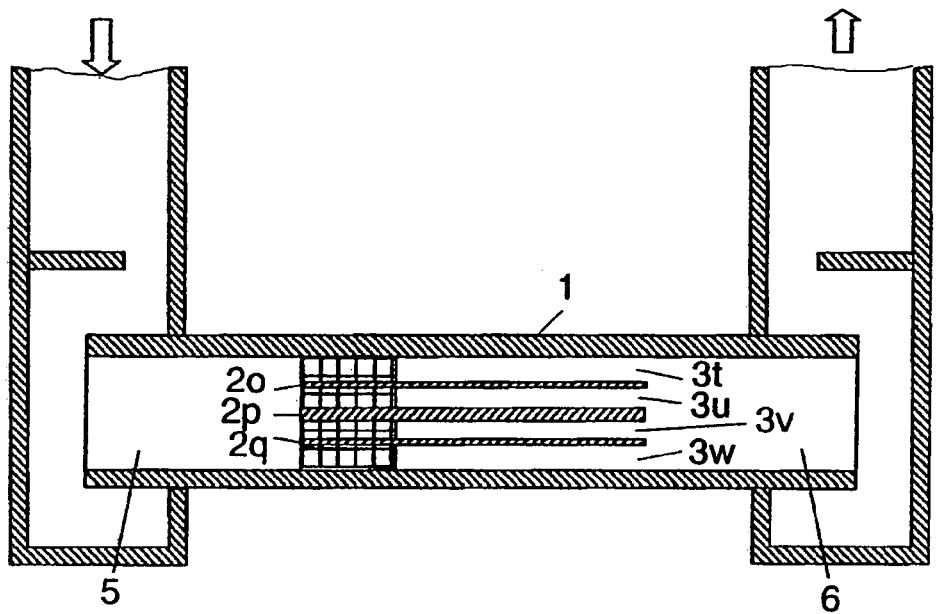
FIG. 12 shows a longitudinal sectional view of an ultrasonic fluid measurement instrument according to exemplary embodiment 10 of the present invention.

Here, changing the cross-sectional area of each split channel 3*n* through 3*s* can be implemented by changing the thicknesses of partition boards 2*o*, 2*p*, and 2*q*, as shown in FIG. 12.

Exemplary Embodiment 10

In this embodiment, as shown in FIG. 12, four split channels 3*t*, 3*u*, 3*v*, and 3*w* are provided, and the thicknesses of partition boards 2*o*, 2*p*, 2*q* is to be changed.

Here, in this embodiment, the cross-sectional area is incremented from the center part to external of measurement part 1. However, how to change the cross-sectional area may not be restricted at all as long as the size of the area corresponds to the flow velocity distribution in the approach channel.

Further, the cross-sectional area and length of the split channels may be changed simultaneously according to the flow velocity distribution. In other words, the length of a split channel with a high flow velocity of fluid is to be longer than the others and additionally its cross-sectional area is to be smaller than the others.

At least one of the changes in cross-sectional area and length of split channels is generally made stepwise. Further, the length may be decremented and additionally the cross-sectional area may be incremented from a channel with a low flow velocity to a large flow velocity.

Exemplary Embodiment 11

Figure 13:
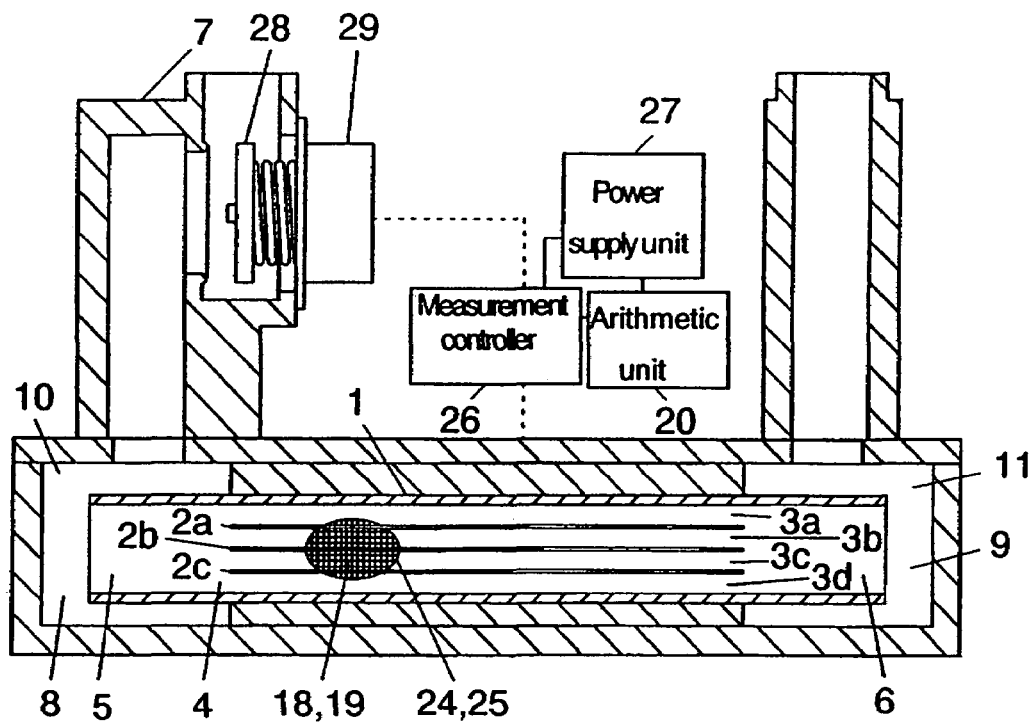
FIG. 13 shows a longitudinal sectional view of an ultrasonic fluid measurement instrument according to exemplary embodiment 11 of the present invention.
Figure 14:
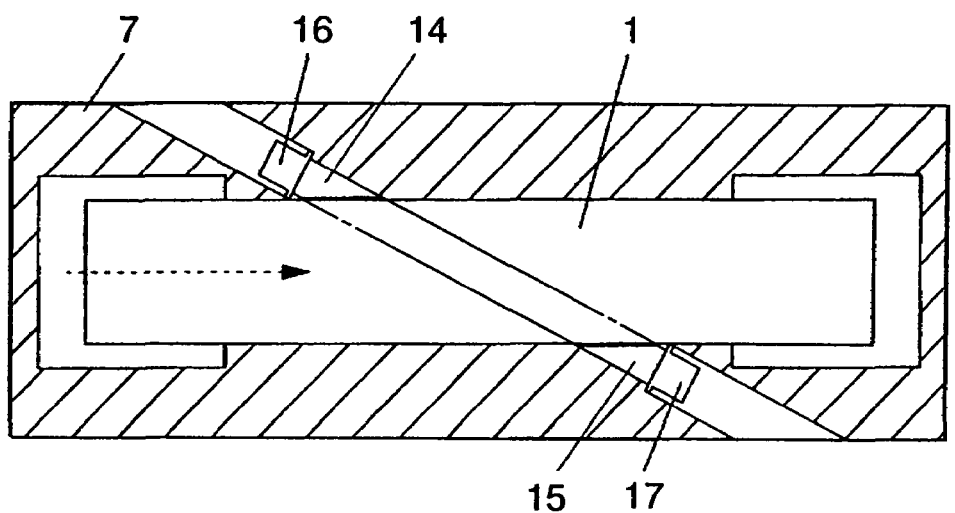
FIG. 14 shows a transverse sectional view of an ultrasonic fluid measurement instrument according to exemplary embodiment 11 of the present invention.

In this embodiment, as shown in FIGS. 13 and 14, measurement part 1 equipped with multilayer channel 4 is structured separately from fluid channel 7.

More specifically, four split channels 3*a* through 3*d* composing multilayer channel 4 are partitioned by three partition boards 2*a* through 2*c*. Measurement part 1 is rectangular with its rectangle cross-section and has openings 24 and 25 at its short side wall.

Meanwhile, ultrasonic transmitter-receivers 16 and 17 are arranged at the side of fluid channel 7 where above-mentioned measurement part 1 is inserted. For this reason, recesses 14 and 15 are formed at the short sides facing each other, of fluid channel 7 for installing above-mentioned ultrasonic transmitter-receivers 16 and 17 therein.

When measurement part 1 is set to fluid channel 7, recesses 14 and 15 positionally conform to openings 24 and 25, respectively, to form an ultrasonic propagation path in each split channel 3 through opens 24 and 25.

The above-mentioned openings 24 and 25 are provided with ultrasonic-transparent members 18 and 19 to cover them, made of a perforated plate such as wire mesh and punching metal, so that fluid will not flow into recesses 14 and 15. (Here, the figure shows one facing to ultrasonic transmitter-receiver 16 at the upstream side, as a representative.)

The propagation time of ultrasonic waves between ultrasonic transmitter-receivers 16 and 17 is measured by measurement controller 26, and arithmetic unit 20 calculates flow velocity according to the propagation time, and flow volume according to the velocity when needed. These measurement controller 26, arithmetic unit 20, and others are driven on battery (power supply unit) 27 such as a lithium battery.

The inlet side of fluid channel 7 is connected to valve plug 28 that closes at the time of earthquake and the like. Drive unit 29 of valve plug 28, measurement controller 26, arithmetic unit 20, and others are arranged on an area enclosed by a U-shaped channel component material, in a compact structure on the whole.

The ultrasonic propagation path between ultrasonic transmitter-receivers 16 and 17 faces to central partition board 2*b*, mainly to central adjacent two split channels 3*b* and 3*c*.

In the above-mentioned arrangement, a description will be made for the flow volume measurement of fluid.

First, ultrasonic waves are generated from ultrasonic transmitter-receiver 16 at the upstream side in the forward direction of the stream and additionally so as to obliquely cross the stream.

These ultrasonic waves propagate through the fluid stream at the velocity of sound, are detected by ultrasonic transmitter-receiver 17 at the downstream side, and then converted to an electric signal. Next, the electric signal is amplified by the amplifier of measurement controller 26, and compared to a reference signal by the comparator to detect that an ultrasonic signal has been received.

The variation in this compared signal is sent to the repetition part, and transmitted again by the trigger part via the delay part.

This repetition completes with the count set in the count setting part.

The timer part resets its timer when a first trigger signal is transmitted, and measures the time until when the repetition completes.

When the transmitting of the ultrasonic waves from upstream to downstream ends, the switching part switches the direction of transmitting and receiving.

Transmission is performed from ultrasonic transmitter-receiver 17 at the downstream side to ultrasonic transmitter-receiver 16 at the upstream side, namely from downstream to upstream, and in the same way as the above, transmission is repeatedly performed to measure the time. Arithmetic unit 20 calculates flow velocity from the time difference between the time from upstream to downstream and that in the reverse direction, using an arithmetic expression such as reciprocal difference of propagation time, and flow volume when needed.

Valve plug 28 is to be closed at the time of abnormal fluid flow, earthquake, or others.

Meanwhile, as mentioned above, measurement part 1, structured separately from fluid channel 7, can be processed independently. Further, a highly accurate measurement part is easily available, resulting in ensuring a precise response to a specification change.

Next, a description will be made for how fluid flows into measurement part 1. Fluid passes through valve plug 28 and then reaches upstream chamber 10. Next, fluid is rectified in approach channel 5 of measurement part 1, to flow into split channels 3a through 3d.

Therefore, fluid flows stably and evenly through split channels 3a through 3d, dispensing with measuring flow velocity by ultrasonic transmitter-receivers 16 and 17 all over split channels 3a through 3d, and thus the original objective is achieved as long as the measurement is mainly performed for central adjacent split channels 3b and 3c.

Each height of at least central adjacent split channels 3b and 3c as measurement targets is set within the range of the boundary layer region so that the measurement accuracy will not be influenced by external factors.

If target fluid is gaseous matter such as gas, the boundary layer of a partition board is 15 mm thick, and thus each height of split channels 3b and 3c is to be within 30 mm in order to be within a range of the boundary layer region.

Exemplary Embodiment 12

Figure 15:
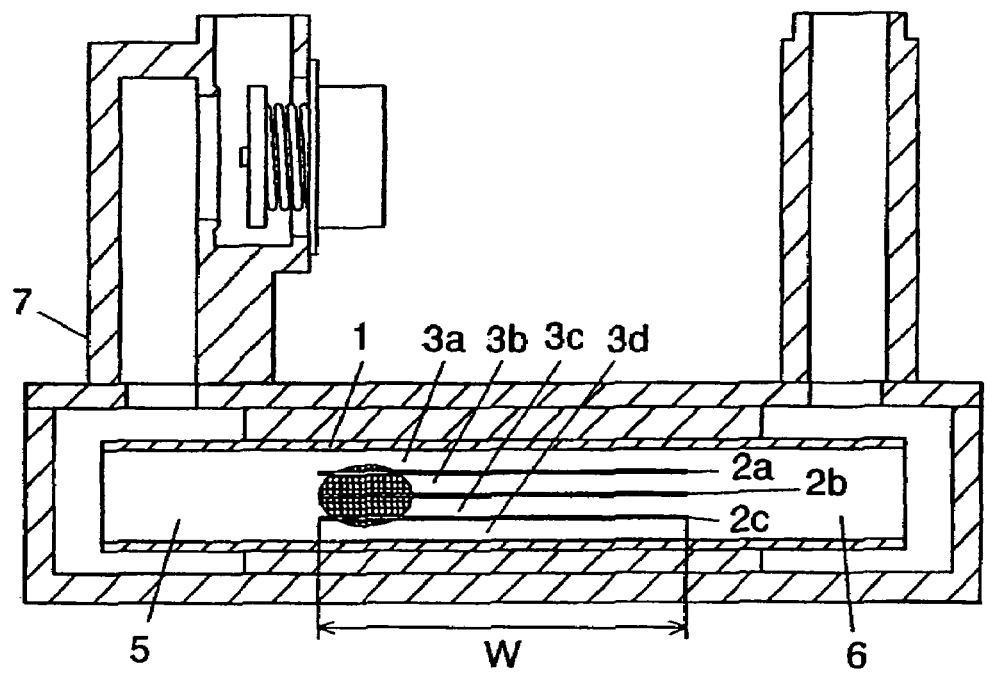
FIG. 15 shows a longitudinal sectional view of an ultrasonic fluid measurement instrument according to exemplary embodiment 12 of the present invention.

In this embodiment, as shown in FIG. 15, fluid flow in split channels 3a through 3d is to be favorable. For this purpose, the length of partition boards 2a through 2c, namely the length of split channels 3a through 3d is to be substantially equal to the length (W) of the ultrasonic transmitting and receiving regions of ultrasonic transmitter-receivers 16 and 17.

This arrangement allows the length of partition boards 2a through 2c, namely that of split channels 3a through 3d, to be minimal, proportionately reducing the drop in fluid pressure.

Exemplary Embodiment 13

Figure 16:
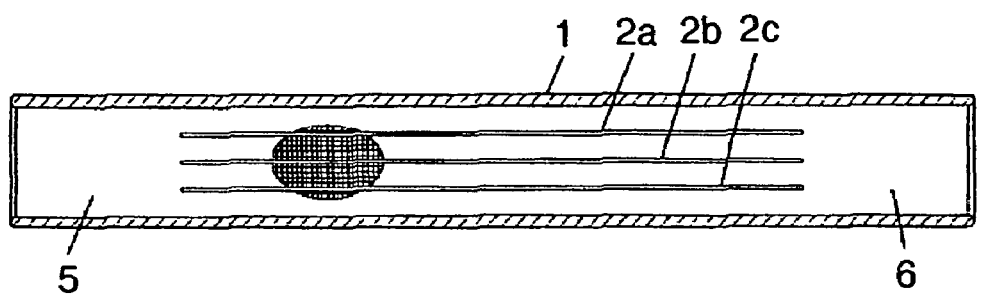
FIG. 16 shows a longitudinal sectional view of the measurement part of an ultrasonic fluid measurement instrument according to exemplary embodiment 13 of the present invention.

In this embodiment, as shown in FIG. 16, the open edges at both ends of measurement part 1 are to be arc-shaped or tapered. In this way, when fluid flows into measurement part 1, the fluid smoothly flows without generating a whirlpool or the like.

Obviously, if the end parts of partition boards 3a through 3c are tapered in the same way, the effect will be increased.

Next, an example is shown in which a rectifying part is provided at the open part of measurement part 1, adding ingenuity in fluid flow into the rectifying part.

Exemplary Embodiment 14

Figure 17:
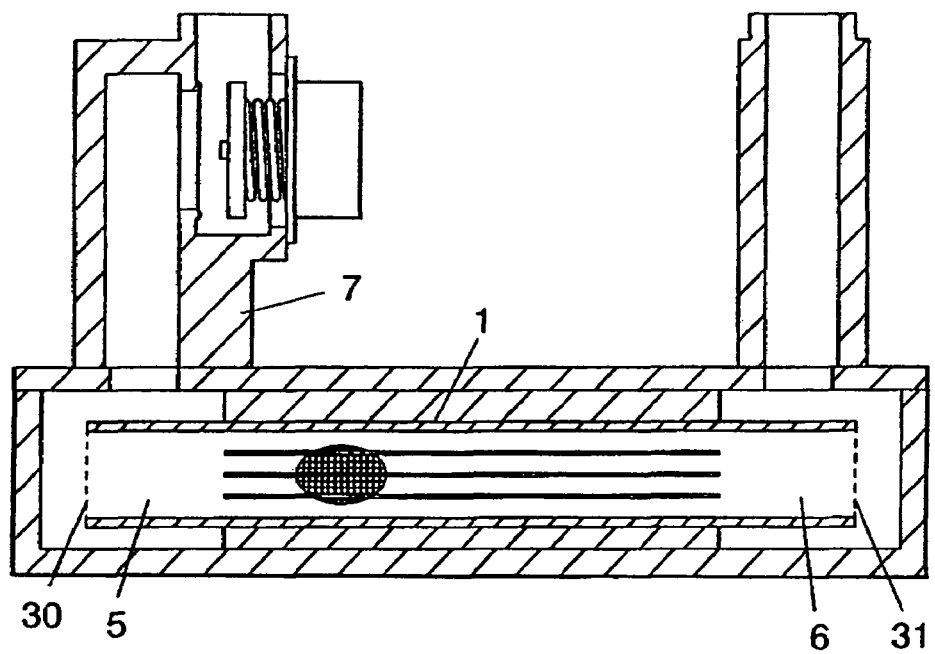
FIG. 17 shows a longitudinal sectional view of an ultrasonic fluid measurement instrument according to exemplary embodiment 14 of the present invention.

This embodiment, as shown in FIG. 17, provides net-like members 30 and 31 such as wire mesh at the open part of measurement part 1.

With this arrangement, a turbulent flow at the upstream side is rectified by net-like member 30 to reach approach channel 5 of measurement part 1 in a form of a stable stream, where the stream is further rectified in this approach channel 5.

Exemplary Embodiment 15

Figure 18:
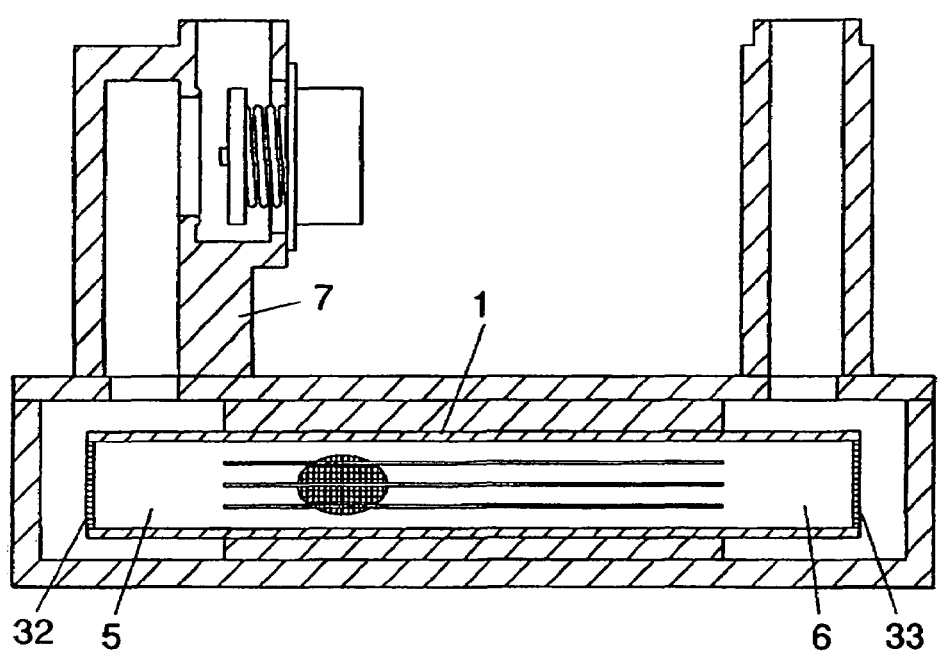
FIG. 18 shows a longitudinal sectional view of an ultrasonic fluid measurement instrument according to exemplary embodiment 15 of the present invention.

This embodiment, as shown in FIG. 18, adopts honeycomb-like porous members 32 and 33 as rectifying parts. It is obvious that the same actions and effects as those in exemplary embodiment 14 are available.

Here, in exemplary embodiments 14 and 15, measures are taken for stabilizing fluid flow into measurement part 1 at the time of reverse flow. If reverse flow does not occur, measures may be taken for stabilizing fluid flow only at the upstream side of measurement part 1.

Exemplary Embodiment 16

Figure 19:
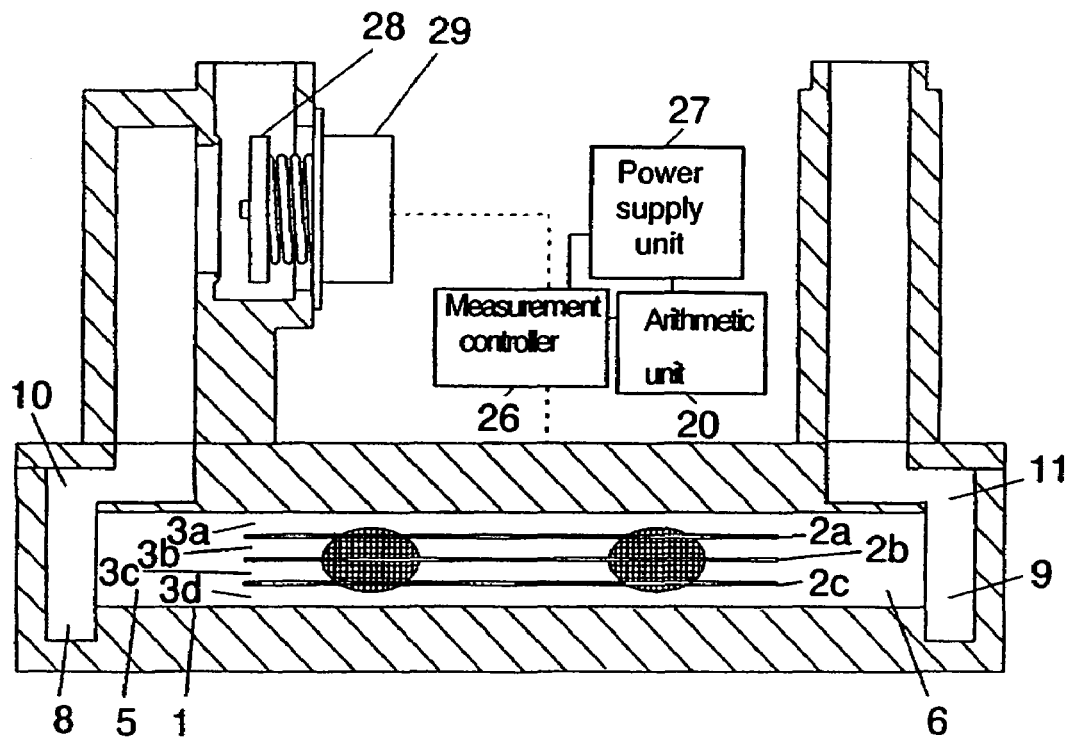
FIG. 19 shows a longitudinal sectional view of an ultrasonic fluid measurement instrument according to exemplary embodiment 16 of the present invention.
Figure 20:
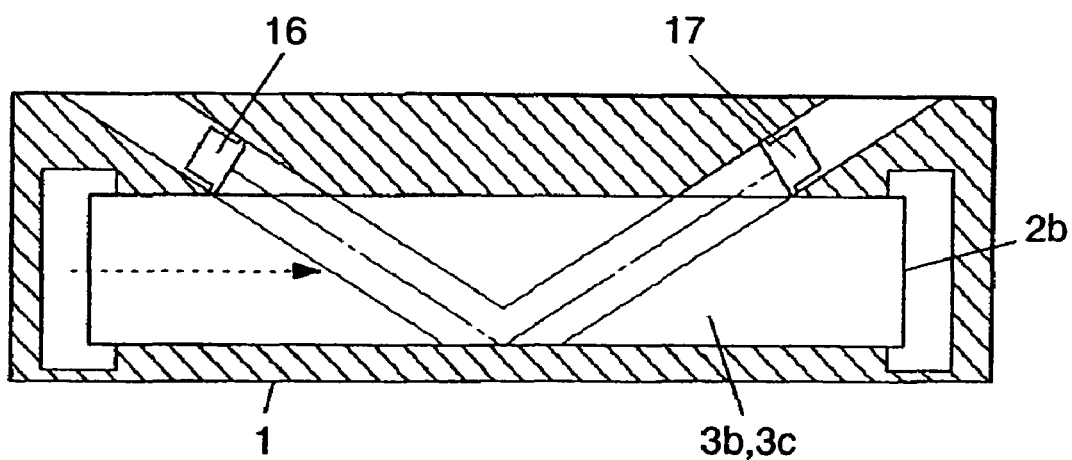
FIG. 20 shows a transverse sectional view for illustrating the actions of an ultrasonic fluid measurement instrument according to exemplary embodiment 16 of the present invention.

In this embodiment, as shown in FIGS. 19 and 20, at least a pair of ultrasonic transmitter-receivers 16 and 17 are arranged on one wall part at the short side of measurement part 1 in the direction of the fluid flow at a given interval.

Ultrasonic transmitter-receivers 16 and 17 are arranged so that ultrasonic waves transmitted from one of them will be reflected by the facing wall to be received by the other one. In other words, they are set so that the ultrasonic propagation path will be V-shaped.

Further, measurement controller 26 transmits and receives ultrasonic waves alternately between ultrasonic transmitter-receivers 16 and 17, measures the time difference between the ultrasonic waves propagation time in the forward direction and that in the backward of the fluid flow, at fixed periods, to output the difference as a propagation time difference signal.

The propagation time difference signal from measurement controller 26 is input to arithmetic unit 20 to calculate flow velocity, and flow volume when needed.

In this example, ultrasonic transmitter-receivers 16 and 17 can be installed on the same side of the wall surface and the length of the ultrasonic propagation path can be set longer than in the case where ultrasonic transmitter-receivers 16 and 17 are installed facing each other and sandwiching the channel part.

This arrangement increases flexibility in mounting angle of ultrasonic transmitter-receivers 16 and 17 and size of the channel width, implementing flow volume measurement instrument with high installability.

Exemplary Embodiment 17

Figure 21:
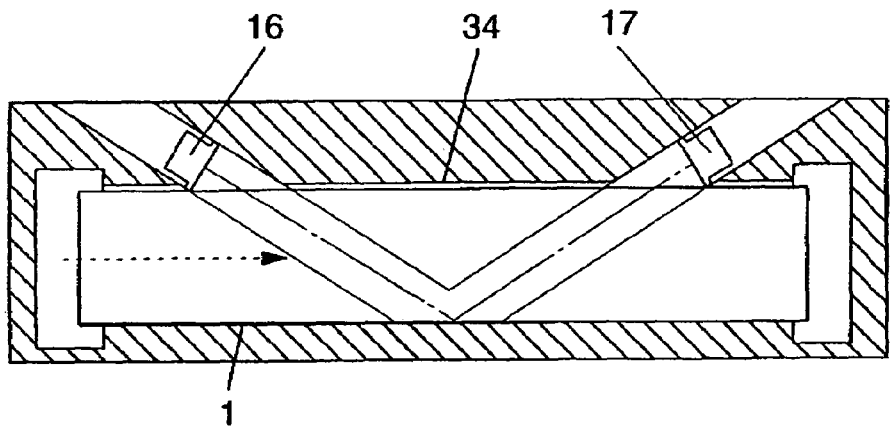
FIG. 21 shows a transverse sectional view for illustrating the actions of an ultrasonic fluid measurement instrument according to exemplary embodiment 17 of the present invention.

In this embodiment, as shown in FIG. 21, the channel wall surface at the side where ultrasonic transmitter-receivers 16 and 17 are mounted is made of ultrasonic waves absorbent member 34 (e.g., resin with its minute porous surface). In this way, some components of ultrasonic waves transmitted from the ultrasonic transmitter-receiver in transmission do not travel along or near the wall surface to be reflected, thus preventing impure components of ultrasonic waves to be received.

Therefore, the receiver mainly receives reflected waves that have passed through the propagation path in the split channels, the waves with a small quantity of noises, improving measurement accuracy.

Exemplary Embodiment 18

Figure 22:
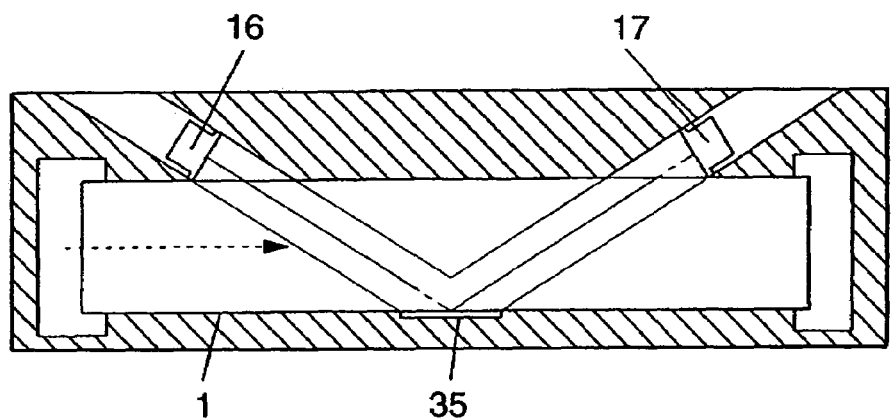
FIG. 22 shows a transverse sectional view for illustrating the actions of an ultrasonic fluid measurement instrument according to exemplary embodiment 18 of the present invention.

In this embodiment, as shown in FIG. 22, ultrasonic reflective member 35 made of a material with a high reflectivity, such as a mirror-finished metal plate, is provided on the ultrasonic reflecting surface in the ultrasonic propagation path. In this way, attenuation and scattering when ultrasonic waves are reflected are reduced to enable ultrasonic waves to efficiently propagate, and to decrease noise components in receiving waves, further improving measurement accuracy.

Exemplary Embodiment 19

Figure 23:
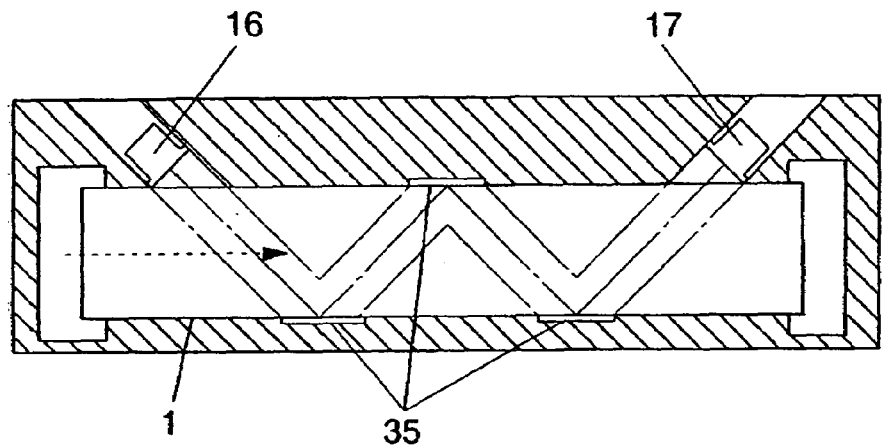
FIG. 23 shows a transverse sectional view for illustrating the actions of an ultrasonic fluid measurement instrument according to exemplary embodiment 19 of the present invention.

In exemplary embodiment 18, the description is made for a V-shaped propagation path, with a single reflection on the ultrasonic propagation path. In this embodiment, as shown in FIG. 23, the propagation path is W-shaped, with two reflections on the facing wall surfaces, which is available with the same effect as in exemplary embodiment 18. In this case, it is obvious that ultrasonic reflective member 35 may be provided on the ultrasonic reflecting surface as well.

Here, in exemplary embodiments 6 through 19, the arrangement of measurement part 1, more specifically the arrangement in which an approach channel is provided in split channels and at both upstream and downstream sides thereof, is the same as in the previous example, and thus its description is omitted.

Further, several examples mentioned in each exemplary embodiment can be obviously implemented singularly or in alternate combination.

A measurement part according to the present invention is provided with an approach channel for preliminarily rectifying fluid flowing to split channels.

In this way, fluid as a measurement target is rectified through the approach channel, and then is to evenly flow to the split channels, resulting in ultrasonic propagation without variation.

A measurement part structured separately from the fluid channel allows easily producing a complicated channel divided into plural split channels by partition boards. In addition, dimensional accuracy can be increased.

The approach channel is to have a fixed size of cross-section in a direction of the fluid flow, and preferably is to be set as L>H, where, assuming that the measurement part is rectangular with its rectangle cross-section, H is the height of the short side, and L is the length of the approach channel in the flow direction.

The thickness of a partition boards is set to be shorter than the wavelength of ultrasonic waves from the ultrasonic transmitter-receiver, for a favorable ultrasonic propagation to split channels. Installing partition boards slopewise toward one of the upstream and downstream sides prevents foreign matter from accumulating.

If one of a plurality of partition boards is positioned in the center of the ultrasonic transmitting region of the ultrasonic transmitter-receiver, fluid measurement can be uniformized by arranging plural split channels symmetrically to this central partition board. Specifically, an odd number of partition boards is used, and one partition board centrally positioned is to be located in the center of the ultrasonic transmitting region.

If the approach channel is positioned so as to project into the upstream chamber in the fluid channel, the fluid takes a detouring stream form to flow into the approach channel.

Therefore, even if the inlet side of the fluid channel bends, the above-mentioned detouring stream corrects deflecting components of the stream, and then flows to the approach channel.

If at least a part of the path surface of the split channels is surface-treated with a nonviscous material, foreign matter can be prevented from attaching to the maximum extent possible.

Covering the side of the split channels of the area where the ultrasonic transmitter-receivers have been installed with a perforated plate eliminates turbulent flows in the split channels, further improving measurement accuracy of ultrasonic waves. Wire mesh with 50 to 500 meshes may be used instead of a perforated plate.

Uniformizing fluid flow to each split channel dispenses with setting all the split channels as measurement targets by means of ultrasonic waves, but instead, ultrasonic waves may be transmitted to a part of the split channels to receive ultrasonic waves that have propagated through the fluid.

The ultrasonic transmitter-receivers are equipped with piezoelectric oscillators with plural slits that are arranged in parallel with the partition boards. This arrangement enables effective propagation of ultrasonic waves.

Further, arranging the slits on the above-mentioned piezoelectric oscillators orthogonally to the partition boards allows ultrasonic waves to propagate through plural split channels without variation.

In order to increase measurement accuracy by reducing the influence by uneven streams near the boundary layer, by suppressing influx to the vicinity of the channels at both sides of the split channels, to increase flow velocity at the central part, some measures may be taken, such as incrementing the number of split channels from upstream to downstream, changing the length or cross-sectional area of each split channel, and changing the thickness of the partition boards. Both the length and cross-sectional area may be changed.

The ultrasonic transmitter-receivers may be arranged facing each other so that ultrasonic waves will propagate obliquely crossing the split channels. Alternatively, the ultrasonic transmitter-receivers may be arranged on the same side so that ultrasonic waves reflected by the facing surface will propagate obliquely crossing the split channels. For reflecting ultrasonic waves, providing an ultrasonic reflective member on the reflecting wall surface increases efficiency in ultrasonic waves propagation.

The partition boards are to be spaced each other so that split channels will be structured as boundary layer regions. The length of split channels is to correspond to the ultrasonic transmitting and receiving regions of the ultrasonic transmitter-receivers.

Forming the end part of the path wall of the approach channel in the measurement part in a tapered cross-section reduces the flow resistance of the fluid.

Providing a rectifier such as a net-like member or porous member, at the open end part of the approach channel in the measurement part further stabilizes the fluid flow.

INDUSTRIAL APPLICABILITY

An ultrasonic fluid measurement instrument according to the present invention can be used for measuring flow velocity and flow volume of gaseous fluid such as gas and liquid fluid such as water and oil, and even for distinguishing fluid type.

What is claimed is:

1. An ultrasonic fluid measurement instrument comprising:
   a fluid channel having a width;
   a measurement part including:
      an approach channel portion located at an upstream side of said measurement part and extending into said fluid channel to at least a part of the width of said fluid channel; and
      a split channel portion including at least one partition board, said at least one partition board dividing said split channel portion into at least two channels that are open at opposite ends to allow fluid to flow therethrough, said split channel portion being located downstream of said approach channel portion;
   a pair of ultrasonic transmitter-receivers operable to transmit ultrasonic waves into the fluid flowing through the at least two channels of said split channel portion, and receive the ultrasonic waves from the fluid flowing through the at least two channels of said split channel portion; and
   an arithmetic unit operable to calculate at least one of flow velocity of the fluid and flow volume of the fluid based on a propagation time of the ultrasonic waves transmitted and received by said pair of ultrasonic transmitter-receivers;
   wherein said approach channel portion preliminarily rectifies the fluid prior to the fluid flowing to said split channel portion.

2. The ultrasonic fluid measurement instrument as claimed in claim 1, wherein each of said ultrasonic transmitter-receivers are operable to transmit ultrasonic waves to a portion of the at least two channels of said split channel portion.

3. The ultrasonic fluid measurement instrument as claimed in claim 1, wherein each of said ultrasonic transmitter-receivers includes a piezoelectric oscillator having a plurality of slits arranged in parallel with said at least one partition board.

4. The ultrasonic fluid measurement instrument as claimed in claim 1, wherein each of said ultrasonic transmitter-receivers includes a piezoelectric oscillator having a plurality of slits arranged orthogonally to said at least one partition board.

5. The ultrasonic fluid measurement instrument as claimed in claim 1, wherein both sides of an end part of said at least one partition board are projected to an upstream side of said measurement part.

6. The ultrasonic fluid measurement instrument as claimed in claim 1, wherein both sides of an end part of said at least one partition board are retreated to an upstream side of said measurement part.

7. The ultrasonic fluid measurement instrument as claimed in claim 1, wherein an end part of said at least one partition board includes a tapered cross-section.

8. The ultrasonic fluid measurement instrument as claimed in claim 1, wherein a number of the at least two channels of said split channel portion is incremented stepwise from an upstream side to a downstream side of said split channel portion.

9. The ultrasonic fluid measurement instrument as claimed in claim 1, wherein a number of the at least two channels of said split channel portion is incremented stepwise from an upstream side to a downstream side of said split channel portion, and a cross-sectional area of each of the at least two channels is equalized at each step.

10. The ultrasonic fluid measurement instrument as claimed in claim 1, wherein a length of the at least two channels of said split channel portion is set according to a flow velocity distribution of the fluid flowing through said approach channel portion.

11. The ultrasonic fluid measurement instrument as claimed in claim 1, wherein a cross-sectional area of split channel portion is changed according to a flow velocity distribution of the fluid flowing through said approach channel portion.

12. The ultrasonic fluid measurement instrument as claimed in claim 1, wherein a cross-sectional area of the at least two channels of said split channel portion is changed according to a flow velocity distribution of the fluid flowing through said approach channel portion, by changing a thickness of said at least one partition board.

13. The ultrasonic fluid measurement instrument as claimed in claim 1, wherein a length and a cross-sectional area of the at least two channels of said split channel portion are changed according to a flow velocity distribution of the fluid flowing through said approach channel portion.

14. The ultrasonic fluid measurement instrument as claimed in claim 1, wherein said ultrasonic transmitter-receivers are arranged facing each other so that ultrasonic waves propagate obliquely crossing the at least two channels of said split channel portion.

15. The ultrasonic fluid measurement instrument as claimed in claim 1, wherein said ultrasonic transmitter-receivers are disposed at a side wall of said measurement part so that ultrasonic waves reflected by a facing surface propagate obliquely crossing the at least two channels of said split channel portion.

16. The ultrasonic fluid measurement instrument as claimed in claim 1, wherein said ultrasonic transmitter-receivers are disposed at a side wall of said measurement part so that ultrasonic waves reflected by a facing surface propagate obliquely crossing the at least two channels of said split channel portion, and said measurement part includes an ultrasonic reflective member disposed on a wall surface operable to reflect ultrasonic waves.

17. The ultrasonic fluid measurement instrument as claimed in claim 1, wherein said at least one partition board is arranged such that the at least two channels of said split channel portion correspond to a boundary layer region.

18. The ultrasonic fluid measurement instrument as claimed in claim 1, wherein a length of the at least two channels of said split channel portion corresponds to an ultrasonic transmitting and receiving region of each of said ultrasonic transmitter-receivers.

19. The ultrasonic fluid measurement instrument as claimed in claim 1, wherein an end part of a path wall of said approach channel portion of said measurement part includes a tapered cross-section.

20. The ultrasonic fluid measurement instrument as claimed in claim 1, wherein a rectifying part is provided at an open-end part of said approach channel portion of said measurement part.

21. The ultrasonic fluid measurement instrument as claimed in claim 1, wherein a rectifying part including a net-like member is provided at an open-end part of said approach channel portion of said measurement part.

22. The ultrasonic fluid measurement instrument as claimed in claim 1, wherein a rectifying part including a porous member is provided at an open-end part of said approach channel portion of said measurement part.

* * * * *